United States Patent [19]

Wallace

[11] 3,872,131

[45] Mar. 18, 1975

[54] METHOD OF PREPARING QUINOPHTHALONE DYES

[75] Inventor: William E. Wallace, Rensselaer, N.Y.

[73] Assignee: GAF Corporation, New York, N.Y.

[22] Filed: Oct. 1, 1971

[21] Appl. No.: 185,880

[52] U.S. Cl. ............... 260/289 QP, 8/54, 8/178 R, 260/283 CN, 260/283 SA, 260/287 R, 260/346.3, 260/465 D, 260/515 M, 260/515 P

[51] Int. Cl. ............................................ C07d 33/48

[58] Field of Search ............................... 260/289 QP

[56] References Cited
UNITED STATES PATENTS

| | | | |
|---|---|---|---|
| 1,963,374 | 6/1934 | Ogilvif | 260/289 QP |
| 2,818,410 | 12/1957 | Zwilgmeyer | 260/289 QP |
| 3,023,214 | 2/1962 | Richter | 260/289 QP |
| 3,108,109 | 10/1963 | Clarke | 260/289 QP |
| 3,639,405 | 2/1972 | Walker | 260/287 R |

FOREIGN PATENTS OR APPLICATIONS

| | | | |
|---|---|---|---|
| 1,523,982 | 5/1968 | France | 260/289 QP |

*Primary Examiner*—Donald G. Daus
*Attorney, Agent, or Firm*—Walter C. Kehm; Samson B. Leavitt; Joshua J. Ward

[57] ABSTRACT

Quinophthalone dyes are prepared by condensation of 2-methyl-3-hydroxycinchoninic acids with aryl polycarboxylic acids, their anhydrides or mixtures thereof in the presence of N-lower alkyl pyrrolidones as solvents for the reaction.

15 Claims, No Drawings

METHOD OF PREPARING QUINOPHTHALONE DYES

BACKGROUND OF THE INVENTION

1. Field of the Invention

This invention relates or quinophthalone dyestuffs and more particularly to a method of preparing 3'-hydroxyquinophthalones in the presence of N-lower alkyl pyrrolidones as reaction solvents.

2. Description of the Prior Art

3'-Hydroxyquinophthalone compounds are known in the art as being very useful for disperse dying of various fibers such as nylon, polyester, cellulose acetate and cellulose triacetate. These dyestuffs are generally prepared by condensation of the corresponding 2-methylquinoline derivatives with aryl ortho-dicarboxylic acids or their anhydrides. These methods of preparation, however, have not been satisfactory as the products are difficult to handle. For example in U.S. Pat. No. 2,006,022 there is disclosed a process for the preparation of such quinophthalone dyestuffs by condensation of 3-hydroxy-2-quinaldine (3-hydroxy-2-methylquinoline) with phthalic anhydride to form a melt with the condensation occurring in the melt formation. It is impossible however, to adequately agitate this melt as it cools since the agitating equipment is damaged as it hardens. Thus, only a large lump of solid product material is formed which is difficult to manipulate and grind in factory quantities.

There have also been utilized various inert organic solvents for this reaction such as chlorobenzene, orthdichlorobenzene, tri-chlorobenzene, cymene, alcohols and nitrobenzene for use in the condensation of quinaldines with ortho-dicarboxylic acids and/or anhydrides, e.g., phthalic anhydride. See for example U.S. Pat. Nos. 3,023,213 and 3,023,214. In this reaction however, when a trifunctional acid such as trimellitic acid or anhydride is substituted for phthalic anhydride, the intermediates and products are all highly insoluble in the solvent, the melting point of the product is very high and the tendency of the reaction is toward the formation of a difficult to manipulate lump, the solvent being ineffective in maintaining this difficult mass.

A newer departure has been the use of dimethylformamide or dimethylacetamide in condensing quinaldine sulfonic acids with phthalic anhydride and this procedure is disclosed in U.S. Pat. No. 3,108,109. However, as this process is concerned with sulfonic acid substituted compounds, the solublities and melting points are considerably different from those of the unsulfonated compounds of the other references mentioned. Accordingly these solvents have not found wide acceptance for the reaction.

In these processes the solvents of the prior art have not been found to be particularly efficient in the condensation of the 3-hydroxyquinaldines with aryl o-dicarboxylic acids and anhydrides and particularly, when a multi-functional acid such as trimellitic acid is used as the latter reactant. The chief difficulty seems to be that the reflux temperatures are too low to allow the reaction to go smoothly. Thus the resulting yields are generally low and the products require additional purification to remove contaminating products. Also because of the lack of solubility of the product in the solvent, a mass is usually formed, which, while not solid, is not in readily stirrable form. Accordingly, there remains a need in the art for a procedure by which these quinophthalone dyestuffs can be prepared without the disadvantages of these processes of the prior art.

SUMMARY OF THE INVENTION

It is accordingly one object of this invention to provide a procedure for the preparation of 3'-hydroxyquinophthalone dyestuffs which overcomes or otherwise mitigates the problems of the prior art.

A further object of the invention is to provide a procedure for condensation of 2-methyl-3-hydroxycinchoninic acid derivatives with aryl polycarboxylic acids and/or anhydrides wherein the reaction is conducted in the presence of N-alkyl pyrrolidone as a solvent for the reaction.

Other objects and advantages of the present invention will become apparent as the description thereof proceeds.

In satisfaction of the foregoing objects and advantages, there is provided by this invention a method for the preparation of 3-hydroxyquinophthalone dyestuffs by reacting 2-methyl-3-hydroxycinchoninic acids with certain aryl polycarboxylic acids and/or anhydrides in the presence of an N-alkyl pyrrolidone as a solvent for the reaction.

DESCRIPTION OF THE PREFERRED EMBODIMENTS

According to this invention it has been found 3'-hydroxyquinophthalone dyestuffs may be prepared by reacting a 2-methyl-3-hydroxycinchoninic acid with an aryl ortho-polycarboxylic acid and/or anhydride if a lower alkyl pyrrolidone is employed as a solvent for the reaction. It has been discovered that when a particular solvent of this class is used in the reaction, the condensation occurs under such conditions that at all times the reaction mixture is readily stirrable and the resulting product may be easily precipitated by the addition of an alcohol. The resulting mixture may then be filtered and the solid washed to obtain high yields of high purity dyestuffs.

The 2-methyl-3-hydroxycinchoninic acids which are used as starting materials in this process may be described as being of the following general formula:

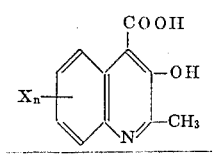

wherein, in this formula, X may be hydrogen, or a halogen atom such as chloro, bromo or fluoro, methyl, lower alkoxy such as methoxy, ethoxy, propoxy and butoxy and nitro, and n may be 0 or an integer of 1 to 4. Further, X may also be cyano, or a sulfonamido group of the formula $-SO_2NR_1R_2$ wherein $R_1$ and $R_2$ are hydrogen or lower alkyl such as methyl, ethyl or butyl, or X may be an acylamido group of the formula $-CONR_1R_2$ wherein $R_1$ and $R_2$ are as described above. When X is cyano, sulfonamido or acylamido, n is preferably 1. These starting materials are well known in the art and are described for example in U.S. Pat. No. 3,023,214.

Representative and highly preferred 3-hydroxy-2-methylcinchoninic acids which may be employed in the reaction are as follows:

3-hydroxy-2-methylcinchoninic acid 5-chloro-3-hydroxy-2-methylcinchoninic acid
6-chloro-3-hydroxy-2-methylcinchoninic acid
7-chloro-3-hydroxy-2-methylcinchoninic acid
6-bromo-3-hydroxy-2-methylcinchoninic acid
6-fluoro-3-hydroxy-2-methylcinchoninic acid
2,6-dimethyl-3-hydroxycinchoninic acid
6-methoxy-3-hydroxy-2-methylcinchoninic acid
6-nitro-3-hydroxy-2-methylcinchoninic acid
7-nitro-3-hydroxy-2-methylcinchoninic acid
6-acetamido-3-hydroxy-2-methylcinchoninic acid
N,N-dimethyl-3-hydroxy-2-methyl-6-sulfamylcinchoninic acid
6-cyano-3-hydroxy-2-methylcinchoninic acid
5,7-dichloro-3-hydroxy-2-methylcinchoninic acid
tetrachloro-3-hydroxy-2-methylcinchoninic acid In the reaction a starting material of this type is reacted with an aryl polycarboxylic acid anhydride thereof, or mixture, the anhydride of which may be described by the following general formula:

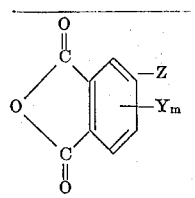

wherein in the above formula, Z is hydrogen or —COOH and Y and m have the same designations as X and $n$ described above, respectively, except that both X and Y may not both be cyano, substituted sulfonamide or acylamido. While either the anhydride or the acid may be employed as the reactant it is preferred to use the anhydride for convenience of operation and purposes of economics. Compounds of this type are described for example in U.S. Pat. Nos. 2,006,022, 3,108,109, 3,023,213 and 3,023,214. Representative aryl polycarboxylic acids or anhydrides which may be used are as follows:
phthalic acid
phthalic anhydride
trimellitic acid
trimellitic acid anhydride
3-chlorophthalic anhydride
4-chlorophthalic anhydride
3,5-dichlorophthalic anhydride
3-bromophthalic anhydride
3-fluorophthalic anhydride
4-fluorophthalic anhydride
tetrachlorophthalic anhydride
3-cyanophthalic anhydride
3-methylphthalic anhydride
4-methylphthalic anhydride
3,5-dimethylphthalic anhydride
4,5-dimethylphthalic anhydride
4-methoxy-3-methylphthalic anhydride
5-methoxy-3-methylphthalic anhydride
5-nitro-phthalic anhydride
3-acetamidophthalic anhydride
N,N-dimethyl-3-sulfamylphthalic anhydride The condensation of these two starting materials result in the preparation of dispersed dyestuffs of the following general formula:

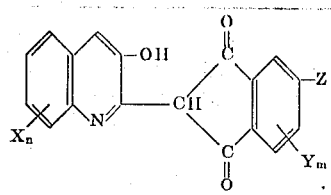

wherein, in the above formula X, Y, $m$, $n$, $R_1$, $R_2$ are as described above. As pointed out hereinbefore these compounds are well known in the art from the above mentioned patents as being good disperse dyestuffs.

According to this invention it has been found that this condensation reaction may be conducted with superior results when the reaction is carried out in the presence of an N- substituted lower alkyl pyrrolidone as a solvent. These solvent materials may be described by the following general formula:

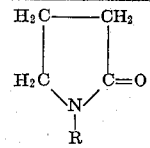

wherein, in the above formula, R is an alkyl group and preferably a lower alkyl group having about 1–7 carbon atoms. N-methylpyrrolidone is a highly preferred solvent for the reaction as it is a commercially available and inexpensive member of the series but others may of course be used. Thus R may be methyl, ethyl, n-propyl and the like. Mixtures of solvents may also be used.

In conducting the reaction about one mole of the cinchoninic acid starting material is reacted with a stoichiometrically equivalent amount, or up to an excess of as high as 100 percent by weight, of the aryl polycarboxylic acid or anhydride. Usually the N-lower alkyl pyrrolidone solvent is employed in an amount of about 2 to 10 moles per mole of reactants used.

In conducting the reaction the starting materials are charged to a reactor adapted for agitation and heated at reflux or at a temperature of about 180°–220°C. until the condensation is completed. In a normal batch run the condensation will be completed in about 1–10 hours. A highly preferred temperature range for this reaction is about 195° to 205°C. Atmospheric pressure is also generally preferred.

After the condensation reaction is completed the resulting mixture is cooled to a temperature below about 100°C. and preferably about 50°–80°C. At this point the mixture is treated with an alcoholic solvent such as a lower alkyl alcohol, for example methyl alcohol, ethyl alcohol, isopropyl alcohol, mixture thereof, or the like. The alcohol serves to precipitate the product since the product is less soluble in the alcohol/pyrrolidone mixture than in the pyrrolidone solvent per se. The alcohol is employed in a sufficient amount to effect substantially complete precipitation of the product. Generally, about an equal amount of alcohol by volume is sufficient. After the alcohol is added to the mixture it is preferably reheated to about 50°–80°C. and agitated until good mixing is achieved. The mixture is then filtered, washed with the alcohol until the washings are light in color and then dried to provide the final product.

The following examples are presented to illustrate the process of the invention but it is not to be considered as limited thereto. Parts are by weight unless otherwise indicated.

EXAMPLE 1

To 150 parts of N-methylpyrrolidone were added 90 parts of 3-hydroxy-2-methylcinchoninic acid and 132 parts phthalic anhydride. The charge was heated gradually to 195°–205°C. held at this temperature for 6 hours, and then cooled to 70°C. At all times the charge was readily stirrable. 200 parts of methanol were added and it was agitated at 65°–70°C. until well mixed. The resulting precipitate was filtered, washed with methanol until washings were light, then removed from the funnel and dried.

The product was obtained in good yield. It dyes polyester fiber in bright yellow shades. The product has the formula:

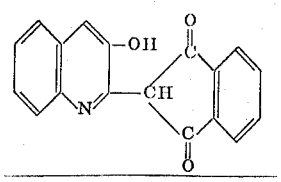

EXAMPLE 2

To 200 parts of N-methylpyrrolidone were added 60 parts of 3-hydroxy-2-methylcinchoninic acid and 88 parts trimellitic acid anhydride. The temperature was gradually increased to 195°–205°C. and maintained at that temperature for 6–10 hours. It was then cooled to 70°C., the mass being readily stirrable during the reaction. 200 Parts of methanol were added, the mixture was reheated to 65°–70°C. and agitated until well mixed. It was then filtered, washed with methanol until the washings were light colored, then removed from the funnel and dried. The product, bright orange in color, had the following formula:

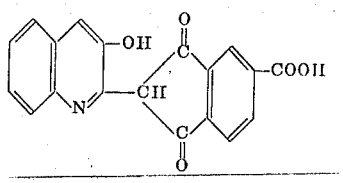

The product dyes wool and nylon in a yellow color from a neutral aqueous dyebath. Paper is dyed in a yellow shade when a neutral aqueous solution of this dyestuff is added to a neutral slurry of paper pulp.

The invention has been described herein by reference to certain preferred embodiments. However, as obvious variations thereon will become apparent to those skilled in the art, the invention is not to be considered as limited thereto.

what is claimed is:

1. An improved process for the preparation of 3'-hydroxyquinophthalones consisting essentially of reacting, at a temperature of about 180°C to about 220°C, a 2-methyl-3-hydroxycinchoninic acid of the formula:

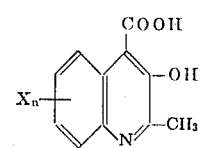

wherein X is a member taken from the group consisting of H; Cl; Br; Fl; $CH_3$; methoxy; ethoxy; propoxy; butoxy; nitro; cyano; a sulfonamide group of the formula $-SO_2NR_1R_2$, wherein said $R_1$ and $R_2$ are taken from the group consisting of H, methyl, ethyl, and butyl; and an acylamido group of the formula $-CONR_1R_2$, wherein $R_1$ and $R_2$ are as described above, and $n$ is 0 or an integer of from 1 to 4 except that $n$ is 1 or 0 when X is nitro, cyano, sulfonamido or acylamido, with an acid taken from the group consisting of (a) an aryl polycarboxylic acid of the formula:

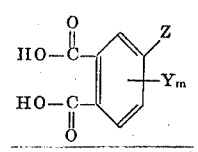

wherein Z is hydrogen or —COOH except that Z is hydrogen when Y is sulfonamido or acylamido and Y and m are the same as X and $n$, respectively, as above, only one of said X and Y being said cyano, substituted sulfonamide or acylamide; (b) an aryl polycarboxylic acid anhydride of the formula:

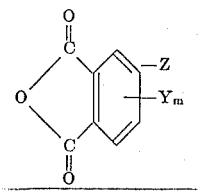

wherein Z, Y and $m$ are the same as above with respect to said aryl polycarboxylic acid, only one of said X and Y being said cyano, substituted sulfonamide or acylamido; and (c) mixtures thereof, said reaction being carried out in the presence of an N-substituted lower alkyl pyrrolidone solvent having the formula:

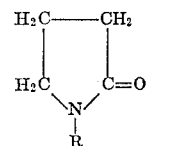

wherein R is a lower alkyl group having about 1–7 carbon atoms, the resulting product formed in the reaction mixture having the formula:

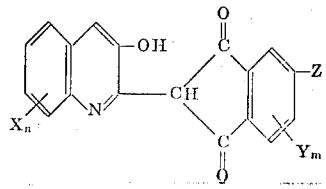

wherein X, Y, m, n, R₁ and R₂ are as described above, whereby the presence of said pyrrolidone solvent serves to render the reaction mixture readily stirrable during the desired reaction operation, the resulting product being conveniently precipitated therefrom in the isolation of said product in high yields as disperse dyestuffs of high purity and quality.

2. The precess of claim 1 in which said reaction temperature is from about 195°C to about 205°C.

3. The process of claim 1 in which said pyrrolidone solvent is N-methyl-pyrrolidone.

4. The process of claim 3 in which said cinchoninic acid comprises 3-hydroxy-2-methylcinchoninic acid.

5. The process of claim 4 in which said anhydride comprises phthalic anhydride.

6. The process of claim 4 in which said anhydride comprises trimellitic acid anhydride.

7. The process of claim 1 in which said pyrrolidone solvent is employed in an amount within the range of from about 2 to about 10 moles per mole of reactants employed in said reaction mixture.

8. The process of claim 1 in which said aryl polycarboxylic acid reactant is employed in an amount within the range of from the stoichiometric amount for reaction with said cinchoninic acid up to an excess of about 100 weight % thereof.

9. An improved process for the preparation of 3'-hydroxyquinophthalone consisting essentially of:
   a. reacting, at a temperature of about 180°C to about 220°C, a 2-methyl-3-hydroxycinchoninic acid of the formula:

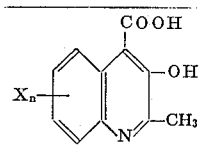

wherein X is a member taken from the group consisting of H; Cl; Br; Fl; CH₃; methoxy; ethoxy; propoxy; butoxy; nitro; cyano; a sulfonamide group of the formula —SO₂NR₁R₂, wherein said R₁ and R₂ are taken from the group consisting of H, methyl, ethyl, and butyl; and an acylamido group of the formula —CONR₁R₂, wherein R₁ and R₂ are as described above, and n is 0 or an integer of from 1 to 4, with an acid taken from the group consisting of (1) an aryl polycarboxylic acid of the formula:

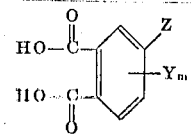

wherein Z is hydrogen or —COOH and Y and m are the same as X and n, respectively, as above, only one of said X and Y being said cyano, substituted sulfonamide or acylamido; (2) an aryl polycarboxylic acid anhydride of the formula:

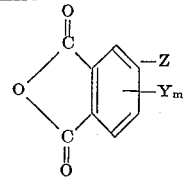

wherein Z, Y and m are the same as above with respect to said aryl polycarboxylic acid, only one of said X and Y being said cyano, substituted sulfonamide or acylamido; and (3) mixtures thereof, said reaction being carried out in the presence of an N-substituted lower alkyl pyrrolidone solvent having the formula:

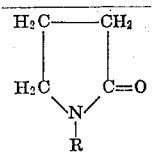

wherein R is a lower alkyl group having about 1–7 carbon atoms; and
   b. cooling said reaction mixture to a temperature below about 100°C; and
   c. treating said cooled mixture with a lower alkyl alcohol, thus precipitating said product therefrom.

10. The process of claim 9 in which said reaction mixture is cooled to a temperature of from about 50°C to about 80°C.

11. The process of claim 9 in which said product is separated from the reaction mixture by filtering the reaction mixture containing said precipitated product and said pyrrolidone solvent and lower alkyl alcohol.

12. The process of claim 9 in which said pyrrolidone solvent comprises N-methylpyrrolidone.

13. The process of claim 12 in which said cinchoninic acid comprises 3-hydroxy-2-methylcinchoninic acid.

14. The process of claim 13 in which said anhydride comprises phthalic anhydride.

15. The process of claim 13 in which said anhydride comprises trimellitic acid anhydride.

* * * * *